May 17, 1966
G. R. ASCHAUER
3,251,185
JET PROPELLED WATER CRAFT
Filed July 5, 1962
6 Sheets-Sheet 1
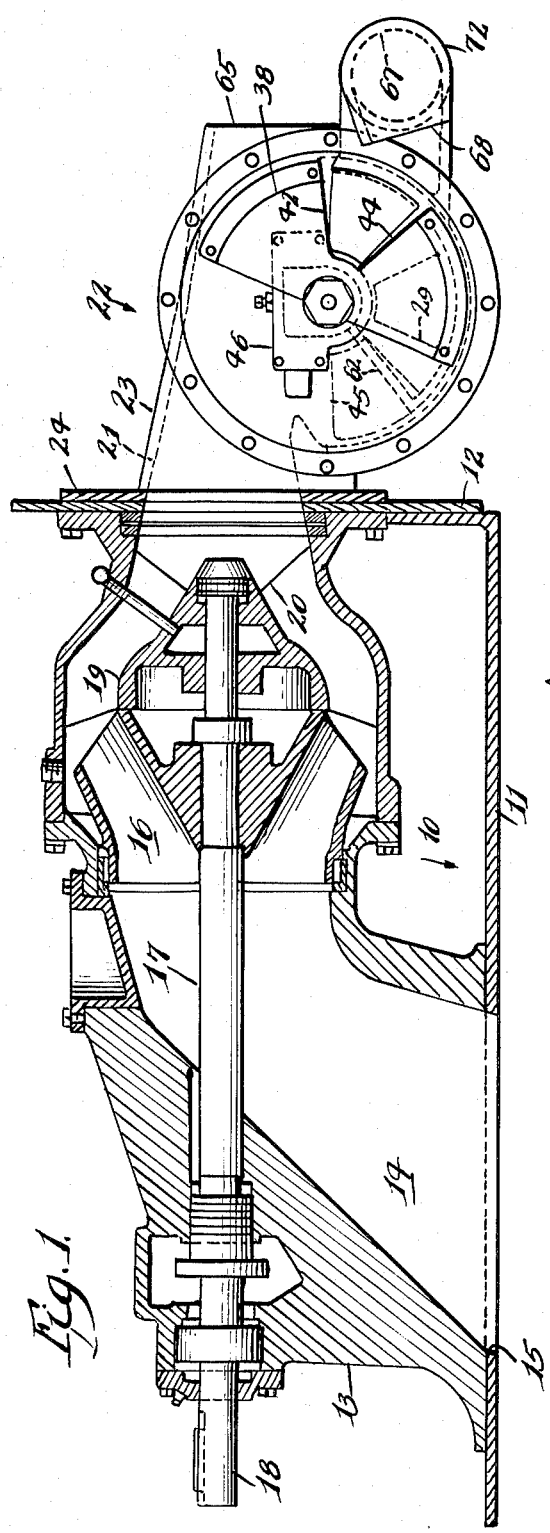
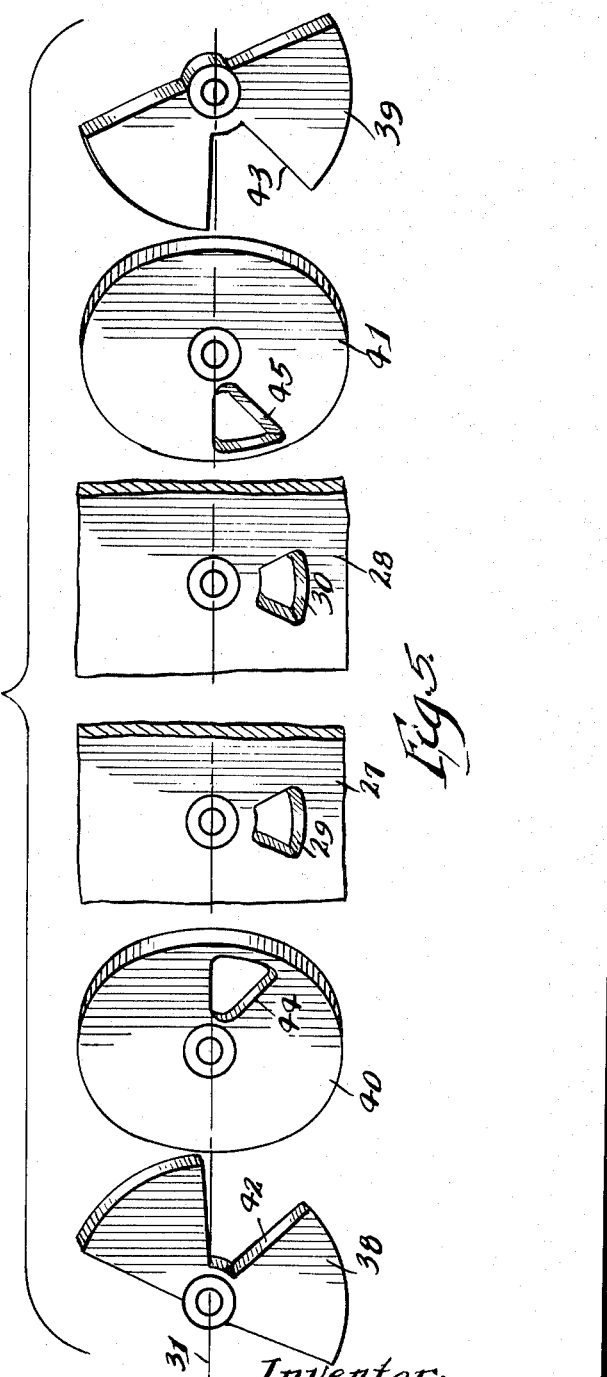
Inventor.
George R. Aschauer.
By. John O. Dailey
Attorney.

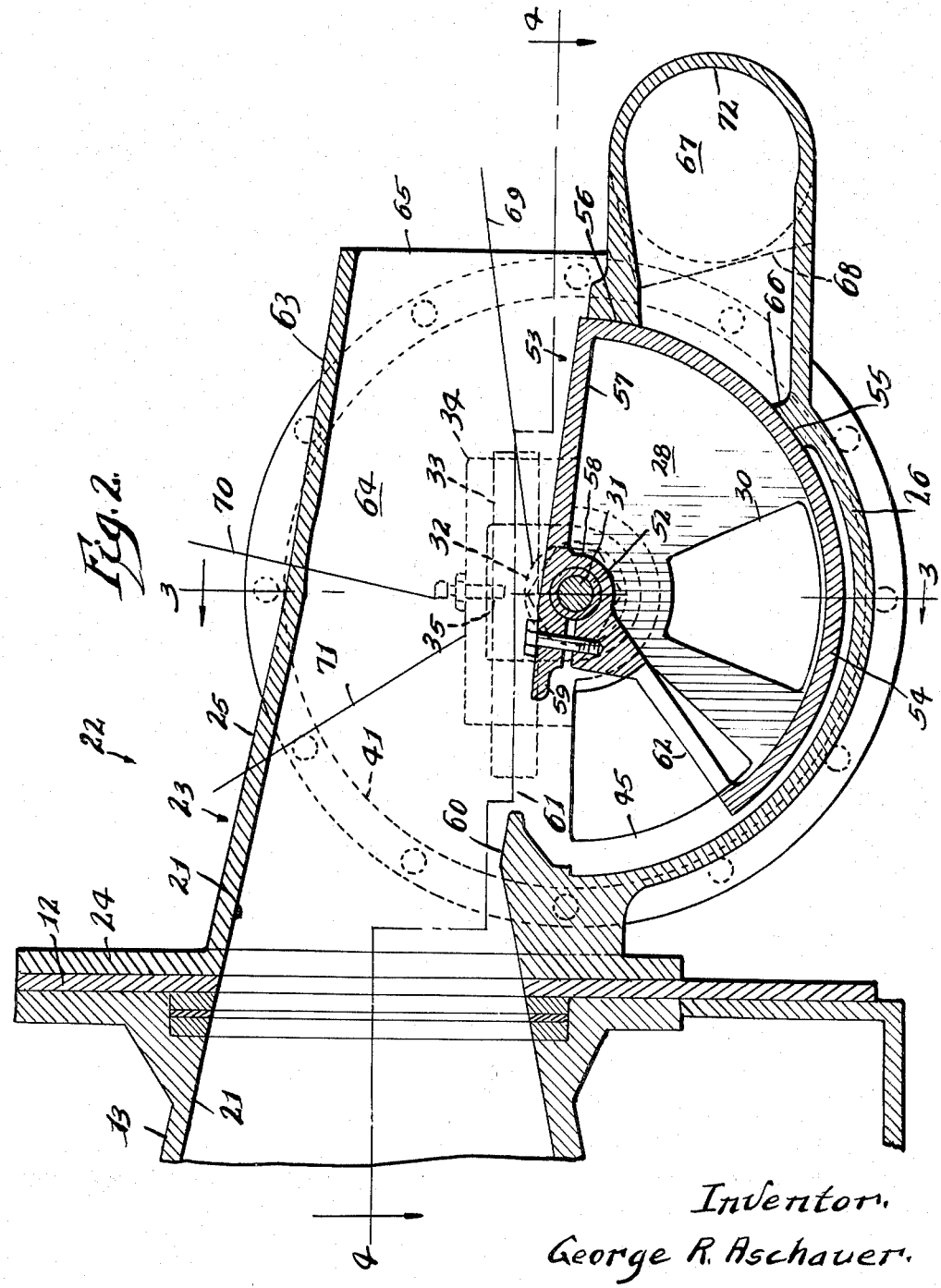

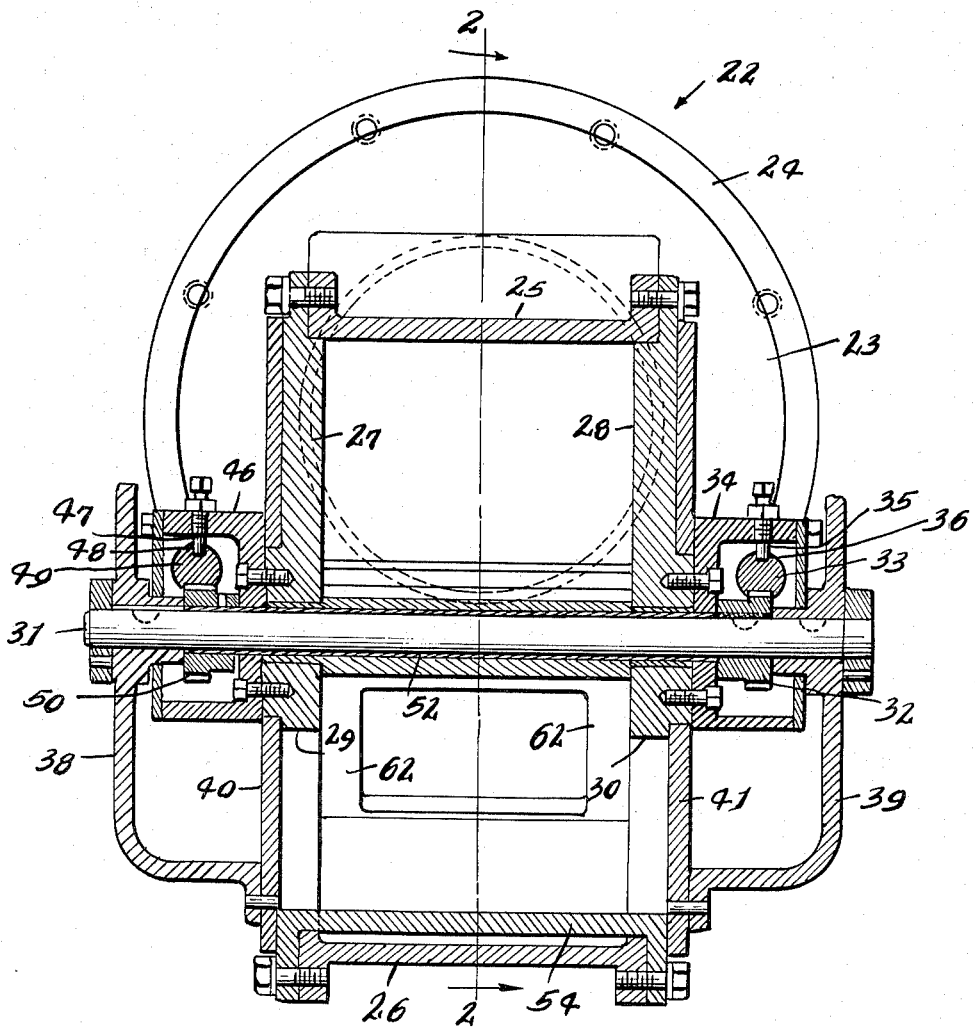

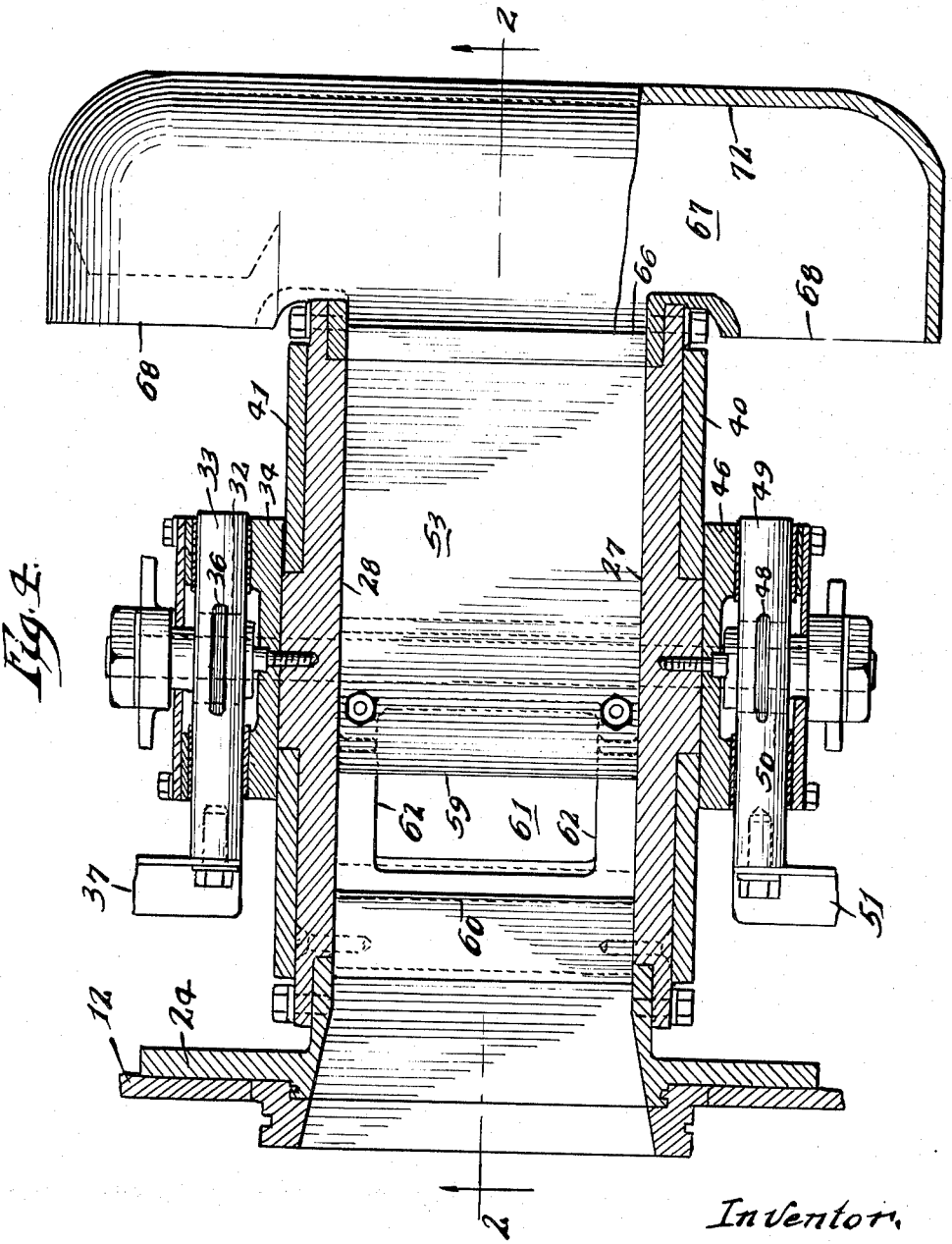

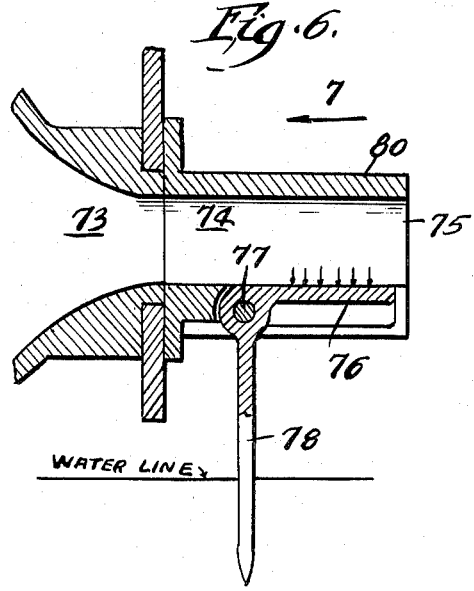
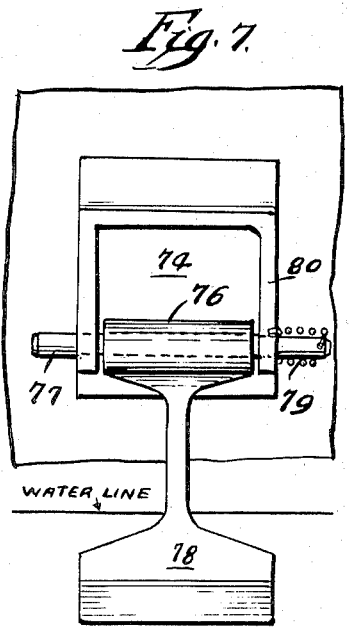
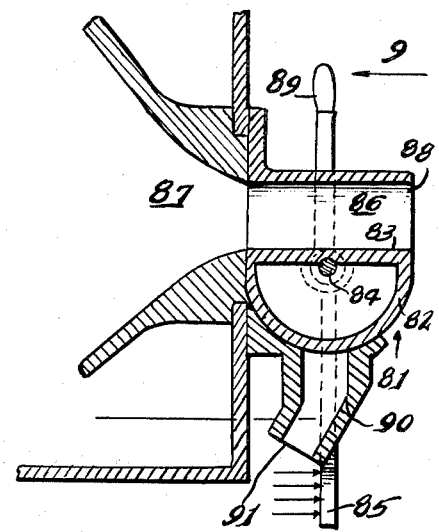
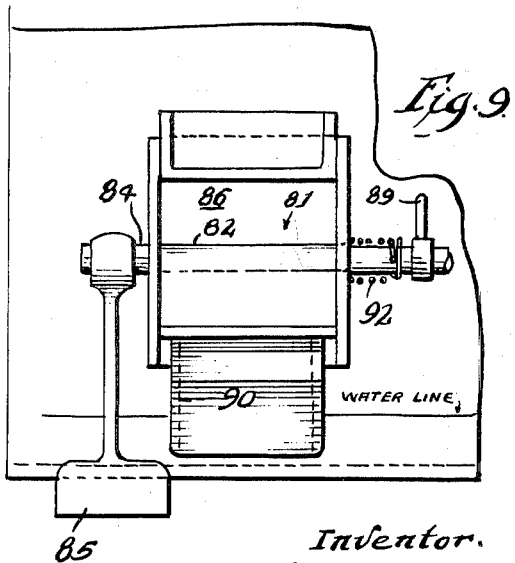

May 17, 1966 G. R. ASCHAUER 3,251,185
JET PROPELLED WATER CRAFT

Filed July 5, 1962 6 Sheets-Sheet 6

Inventor.
George R. Aschauer.
By John W. Darley
Attorney.

United States Patent Office 3,251,185
Patented May 17, 1966

3,251,185
JET PROPELLED WATER CRAFT
George R. Aschauer, Racine, Wis., assignor to Twin Disc Clutch Company, Racine, Wis., a corporation of Wisconsin
Filed July 5, 1962, Ser. No. 207,642
3 Claims. (Cl. 60—35.54)

My invention relates to jet propelled water craft and is concerned primarily with an arrangement characterized by maximum propulsive efficiency and steering proficiency.

With respect to water craft, propulsive efficiency is defined as the ratio of the power put into the hull and the power put out by the engine. It is known that, generally speakibng, maximum propulsive efficiency is obtained when the jet velocity varies directly with hull velocity and specifically is about 1.5 to 2 times the velocity of the hull. Prior structures in this area generally establish one jet velocity for any given engine speed, regardless of variations in loads on the boat and water and weather conditon, and are not adapted to maintain maximum propulsive efficiency over an infinite range of hull speeds.

It is therefore one object of the invention to provide a jet propulsion structure for boats having a nozzle incorporating an adjustable orifice arranged to maintain maximum propulsive efficiency in relation to variations in engine speed and hull loads.

A further object is to provide a structure of the character indicated which is adjustable to provide forward and reverse movements of the boat, positive steering during either of these movements and at any speed, and positive steering under a so-called neutral condition when the jet propulsion is interrupted and the boat is moving under its own momentum.

A further object is the provision of a jet propulsion structure whose reaction effect may be manually or automatically controlled in response to the speed of the boat.

In the drawings:

FIG. 1 is an elevation of the improved structure, partly in section.

FIG. 2 is an enlarged sectional elevation of the control portion of the structure as viewed in FIG. 1 and as taken along the lines 2—2 in FIGS. 3 and 4.

FIGS. 3 and 4 are sections along the lines 3—3 and 4—4, respectively, in FIG. 2.

FIG. 5 is a schematic, exploded view showing the functional relation of the steering control assembly.

FIG. 6 is a sectional elevation of a modified structure for automatically varying the jet velocity.

FIG. 7 is an end view looking in the direction of the arrow 7 in FIG. 6.

FIG. 8 is a sectional elevation constituting a modification of the FIG. 6 structure, the jet control valve being of the same general type as shown in FIG. 2.

FIG. 9 is an end view looking in the direction of the arrow 9 in FIG. 8.

Figure 10:
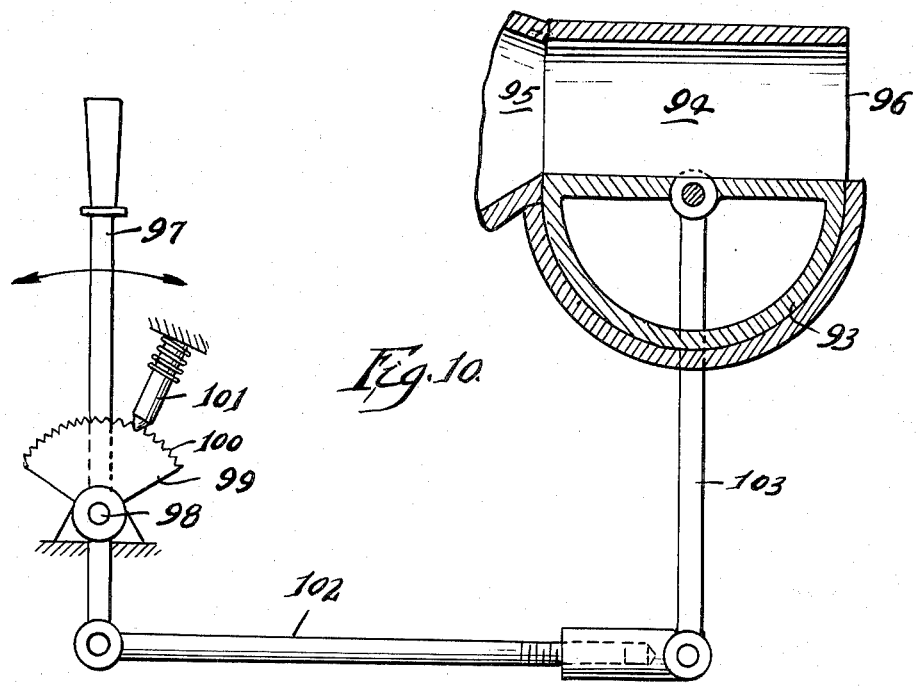

FIG. 10 is an elevation, partly in section, showing an arrangement for manually controlling the jet control valve.

Figure 11:
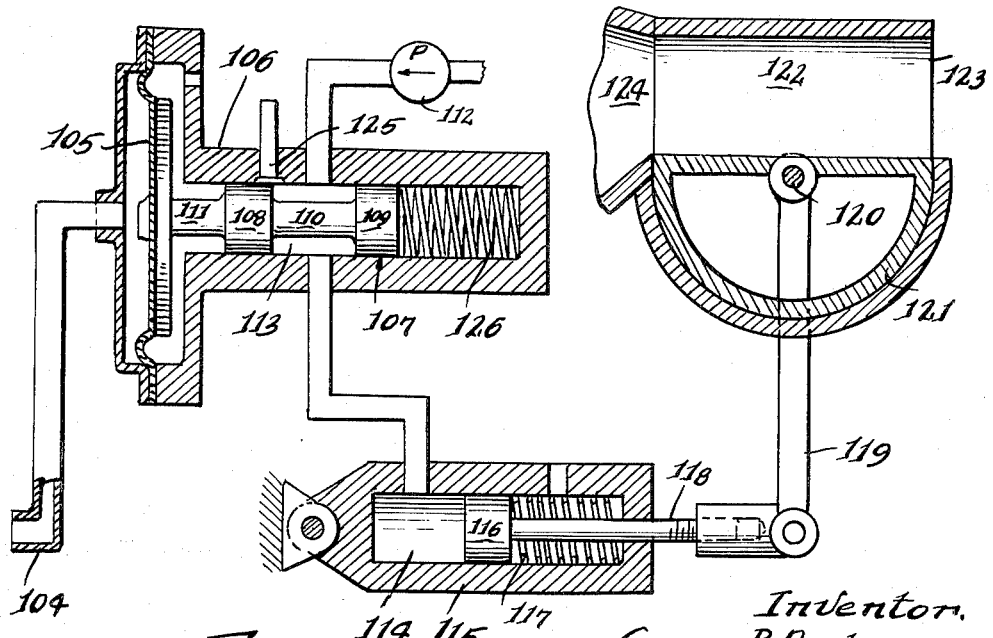

FIG. 11 is a schematic, sectional elevation for power actuating the valve control on the jet velocity that is automatically responsive to boat speed.

Referring to FIG. 1, the numeral 10 fragmentarily designates a conventional boat having a bottom 11 and a transom 12. Suitably mounted on the bottom 11 adjacent the transom 12 is a pump casing 13 having one end of a water passage 14 communicating with an intake port 15 in the bottom 11 which would be provided with a conventional screen (not shown). The other end of the passage 14 is in water supply communication with a centrifugal pump 16 fast on a shaft 17 that is journaled at one end in the casing 13 and extends therebeyond for driven connection, as at 18, with a power source (not shown). The pump 16 is intended to be generally representative of any pumping means for increasing the pressure of the water received from the intake port 15. The other end of the shaft 17 is journaled in a member 19 supported within the casing 13 by spaced stator blades 20 adjacent the outlet of the pump 16. The discharge from the pump 16 is through a converging passage 21 partly included in the casing 13 and partly within a nozzle control device generally designated by the numeral 22 which, as presently described, is operable to selectively control forward, reverse and turning movements of the boat, and also a blocking of the jet discharge. All jet propelled movements of the boat are accomplished with maximum propulsive efficiency.

So far as described and expressly with reference to the structure to the left of the transom 12 in FIG. 1, the pumping arrangement is generally old.

Referring to FIGS. 2 and 3, the control device 22 includes a housing 23 which carries a flange 24 at its forward end for attachment to the transom 12, a top wall 25 which defines the upper part of the passage 21, a semicircular, bottom wall 26, and spaced, parallel, port and starboard side walls 27 and 28, respetcively, which connect the walls 25 and 26. The side walls 27 and 28 respectively include in the lower portions thereof fixed ports 29 and 30 for a purpose presently explained and while their shapes are shown as trapezoidal, this is not restrictive.

Bridged between the side walls 27 and 28 and extending beyond both is a suitably journaled shaft 31 which is keyed adjacent to and outside of the wall 28 (see FIG. 3) to a gear 32 that meshes with a rack 33 which is slidable in a casing 34 attached to the side wall 28 (see FIG. 4) and is held against rotation by a pin 35 carried by the casing 34 and operating in an elongated groove 36 recessed in the upper portion of the rack 33. Reciprocation of the rack 33 is effected by an arm 37 with resulting rotative movements of the shaft 31.

The ends of the shaft 31 are keyed to port and starboard members 38 and 39 (see FIGS. 1 and 3) which are additionally pinned to rotatable, port and starboard, plate valves 40 and 41 that are journaled on the side walls 27 and 28, all respectively. As shown in FIGS. 1 and 5, the member 38 is semicircular in shape and includes a sector-like opening 42 extending from the curved periphery of the member 38 midway of the ends thereof and, as shown in FIG. 5, the member 39 is shaped like the member 38, but reversed in position, and also includes a sector-like opening 43 located like the opening 42. From the foregoing, it will be understood that reciprocations of the rack 33 effect through the shaft 31 and members 38 and 39 rotary movements of the plate valves 40 and 41, respectively. Referring to FIGS. 1, 2 and 5, the plate valves 40 and 41 include ports 44 and 45 which are constantly aligned with the openings 42 and 43, all respectively, for a purpose presently explained.

On the opposite side of the housing 23 (see FIGS. 3 and 4), a casing 46, similar to the casing 34, is attached to the side wall 27 and carries a pin 47 operable in an elongated groove 48 provided in the upper surface of a rack 49 that meshes with a gear 50 and reciprocation of the rack 49 is controlled by an arm 51.

From FIG. 3, it will be apparent that the axial movements of the plate valves 40 and 41 are prevented by having their inner portions positioned between the casing 46 and side wall 27, and the casing 34 and the side wall 28, respectively.

The gear 50 is secured to a sleeve shaft 52 that encircles the shaft 31 and extends between the side walls 27 and 28 and is journaled therein. Suitably clamped on the sleeve shaft 52 between and having fitting relation to the side walls 27 and 28 is a rotary, flow control valve, generally designated by the numeral 53. The shape of the valve 53 (see FIG. 2) is part cylindrical and shell-like in construction and it includes a cylindrical wall 54 which is concentric with the housing wall 26 and is spaced therefrom except for spaced bosses 55 and 56 provided on the wall 26 and with which bosses the wall 54 has susbtantially leak proof contact.

One end of the wall 54 connects by a radial wall 57, substantially considered, with the hub 58 which is clamped on the sleeve shaft 52 and extends therebeyond for a determined distance, as indicated by the numeral 59, in the direction of a shoulder 60 extending from the wall 26 to define between the shoulder 60 and location 59 an opening 61 for a purpose presently explained. The other end of the wall 54 connects by spaced struts 62—62 with the hub 58 which, in the position of the rotary valve 53 shown in FIG. 2, are positioned below the opening 61. The rotary valve 53 is open ended and its end walls are provided by the walls 27 and 28. Reciprocations of the rack 49 will accordingly provide rotary movements of the valve 53 as desired to regulate water flow through the passage 21 and these movements of the rotary valve 53 are controlled independently of the movements of the plate valves 40 and 41.

With the valve 53 in the position shown in FIG. 2, its wall 57 is substantially parallel to a wall 63 which is a continuation of the wall 25 and included between the walls 57 and 63 is a passage 64 communicating at its opposite ends, respectively, with the converging passage 21 and a discharge orifice 65. The passages 21 and 64 constitute the nozzle passage characteristic of reaction propulsion devices. With water flowing under pressure through the passages 21 and 64 to the orifice 65, it will be apparent that this pressure will also be effective through the opening 61 into the interior of the rotary valve 53.

So far as described, the structure will determine forward movements of the boat at selected speeds and turning movements in the same direction, all as presently described in more detail. The manner of obtaining reverse movements will now be described.

Referring to FIGS. 2 and 4, the curved housing wall 26 is interrupted between the bosses 55 and 56 to provide an opening 66 that communicates with a chamber 67 that extends transversely and terminates in forward facing, discharge orifices 68—68 on opposite sides, respectively, of the housing 23.

For forward movements of the boat, the position of the rotary valve 53 shown in FIG. 2 generally determines low or minimum speed of the boat in accordance with the known propulsive reaction principle characteristic of such a structure. When moved to the position generally indicated by the line 69, the rotary valve 53 establishes a water flow condition through the nozzle device to secure maximum speed of the boat. For maximum propulsive efficiency, the rotary valve 53 is adjustable to vary the water flow to maintain the desired relation between jet and hull velocities as loads on the boat vary and to meet slowing factors such as wind and rough water. This valve adjustment may be determined by feel of the boat or by observing an appropriate instrument on the boat.

When the rotary valve 53 is moved to the position indicated by the line 70, it completely blocks the passage 64. The reaction pressure is then available to clear the intake port 15 of any accumulated debris and, further, it is possible to attach a hose connection (not shown) to the passage 21 for deck cleaning and fire fighting.

So far as described for operation, the rotary valve 53 determines forward, straight ahead movement of the boat. Steering is accomplished by actuation of the plate valves 40 and 41 as will now be described.

During straight ahead running, the positions of the plate valves 40 and 41 are schematically shown in FIG. 5 which indicates functional relation only and not relative axial spacings. Considering FIG. 5 in conjunction with FIG. 3, it will be apparent that, in the stated condition, the ports 44 and 45 are rotarily displaced from the ports 29 and 30 and are masked by the side walls 27 and 28, the ports 29 and 30 being masked by solid portions of the plate valves 40 and 41, all respectively, so that all discharge is through the orifice 65.

Considering a turn to port, the shaft 31 is rocked clockwise, as viewed in FIGS. 2 and 5, to register the ports 44 and 29, the plate valve 41 remaining in masking relation to the port 30. The jet flow then divides, part flowing through the discharge orifice 65 to maintain forward boat movement for any selected position of the rotary valve 53 and part moving through the opening 61 (see FIG. 2) to the interior of the valve 53 for discharge through the fully or partly aligned ports 44 and 29. The reaction for a port turn is then against the wall 28 and a solid part of the plate valve 41 and the direction of this thrust is generally normal to the longitudinal axis or keel line of the hull.

Obviously, the extent of the port turn can be controlled by the extent of registration of the ports 44 and 29. For a starboard turn, the shaft 31 is rocked counterclockwise to fully or partly register the ports 45 and 30 with manifest steering reaction on the wall 27 and a solid part of the plate valve 40. It will be further apparent that the course of a boat moving forwardly against a quartering wind or tide can be maintained by appropriately controlling the steering ports.

In all positions of the rotary valve 53 between that shown in FIG. 2 and position 70, the curved valve wall 54 masks the opening 66 (see FIG. 2) so that none of the jet flow reaches the reverse orifices 68—68. To reverse the boat and considering first a straight astern movement with the plate valves 40 and 41 in the positions shown in FIG. 5, the rotary valve 53 is moved to the position generally indicated by the line 71 in FIG. 2 in which the wall 54 clears the opening 66. Most of the pump discharge is then deflected by the rotary valve wall 57 to the interior of the rotary valve 53 for flow successively through the opening 66, chamber 67 and discharge orifices 68—68, the rearward thrust being against the chamber wall 72. Maximum propulsive efficiency for astern movements can be maintained by varying the extent to which the opening 66 is uncovered. Steering control during reverse movements is effected in the same manner as set forth above.

It is possible with the foregoing structure, therefore, to maintain maximum propulsive efficiency in forward and reverse movements under varying load, water and wind conditions and to contain a high thrust during both of these movements at low engine speed which is useful during docking and low speed maneuvering. The device is characterized by improved acceleration performance since the rotary valve 53 is under precise control at all times, and the device is capable of being easier matched to the hull when first installed. Further, positive steering is available under low speed conditions because by reason of the controllable rotary valve 53, the latter can be moved to a position diverting more of the jet flow to the steering ports while providing sufficient flow for boat movement. Accordingly, steering is not dependent upon the boat having steerage way as is true with boats equipped with conventional rudders. For forward movement, jet flow control, the rotary valve 53 may be positioned in any location between that shown in FIG. 2 and a position short of neutral position 70. Moreover, if the boat is under way when the rotary valve 53 is moved to neutral position 70, positive steering is still possible since the steering capability is not dependent upon boat speed as outlined above.

A modified form of the maximum propulsion efficiency nozzle is shown in FIGS. 6 and 7 in which a valve means is automatically positioned to control the jet flow in response to boat speed, forward motion only being considered and the showing being diagrammatic. As in FIG. 2, the structure includes a converging passage 73 whose outlet communicates through a passage 74 with a discharge orifice 75. Jet flow through the nozzle passage formed by the passages 73 and 74 is controlled by a valve 76 which is fast on a rockable shaft 77 and is integral or otherwise connected to a vane 78 which is submerged in the water. If desired, the valve 76 may be biased to the position shown in which the passage 74 is fully open by a torsion spring 79 whose ends are respectively anchored in the shaft 77 and a wall 80 surrounding the passage 74. With the boat under way, the valve 76 is subject to pressure and velocity heads of the jet flow tending to move this valve in a clockwise direction while the impact of water on the vane 78 tends to move the valve 76 in a counterclockwise direction. At various speeds of the boat in relation to engine speed, these forces are in equilibrium.

In FIGS. 8 and 9 is schematically illustrated a modified form of the impact operation of the jet flow control valve which is somewhat similar to the rotary valve 53 in FIG. 2. A rotary valve 81 having a semi-cylindrical shape including a curved wall 82 and a diametral flat wall 83 is fast on a shaft 84 to which is also connected a vane 85 that is submerged in the water. Hence, as in FIG. 6, the valve 81 and vane 85 move together and water impact on the latter will vary the position of the wall 83 in relation to a passage 86 which communicates at its opposite ends, respectively, with a converging passage 87 and a discharge orifice 88.

The valve 81 can be manually moved by a handle 89 to a position fully blocking the passage 86 for the purpose recited in connection with FIG. 2 and to a further position in which the wall 82 uncovers one end of a passage 90 leading to a generally forward facing, discharge orifice 91 for effecting reverse movements, the then position of the wall 83 directing a substantial portion of the flow to the passage 90. A torsion spring 92 may also be mounted on the shaft 84 for the same purpose as in FIGS. 6 and 7.

In FIG. 10 is schematically shown a manual control on a rotary valve 93 which is intended to be the equivalent of the rotary valve 53 with respect to control of forward boat movements and for neutral, the valve being adjustable to control jet flow through a passage 94 which provides communication between a converging passage 95 connected to a pump outlet and a discharge orifice. Control is effected by a handle 97 intermediately pivoted on a shaft 98 and connected to a member 99 having an arcuate, ratchet surface 100 which is continuously engaged by a spring actuated pawl 101. One end of the lever 97 connects through a link 102 with an arm 103 which is also attached to the pivot of the rotary valve 93. This arrangement not only provides for easy control of the valve 93 for forward and neutral movements, but holds this valve in any selected position.

Referring to FIG. 11, there is schematically shown a further modification involving a power actuation of the jet flow control valve that is regulated by the boat speed for determining maximum propulsive efficiency positions of this valve at varying boat speeds. For convenience, the automatic actuation is shown for controlling forward boat movement only.

A pitot tube 104, appropriately carried by the boat, has its open end submerged in the water and facing towards the bow of the boat so that when the latter is moving forward, the tube open end is subjected to water impact pressure which varies with boat speed. This pressure is effective against a diaphragm 105 whose periphery is conventionally mounted in the enlarged end of a casing 106 and slidable within this casing and by way of example is a spool type valve stem 107 comprising spaced lands 108 and 109 which are connected by a reduced neck 110 and a neck 111 connecting the land 108 to the diaphragm 105.

A constantly running oil pump 112, provided with conventional maximum relief (not shown) withdraws oil from a convenient sump for delivery to a chamber 113 included between the lands 108 and 109.

The pressure in the chamber 113, regulated as presently described, is transmitted to a chamber 114 provided in a casing 115 pivoted at one end and in which chamber is reciprocable a piston 116 whose movements towards the right compress a spring 117 interposed between the piston 116 and the adjacent end of the casing 115. The piston 116 connects by means of a rod 118 that extends without the casing 115 with one end of an arm 119 whose opposite end is fast to a shaft 120 as is also a jet flow control valve 121 which is shaped like the valves 81 and 93 in FIGS. 8 and 10, respectively, and hence is a close approximation of the valve 53 in FIG. 2. The valve 121 controls jet flow through a nozzle passage 122 which, as in the other modifications, connects a discharge orifice 123 with a converging passage 123 positioned on the discharge side of a pump (not shown).

With the valve 121 in the position shown, the boat proceeds at minimum speed and is unaffected by whatever pressure exists in the chamber 114 and hence in the chamber 113. This pressure is then either extremely low or non-existent since the pump pressure is then largely directed through a port 125 leading to the sump and which port is uncovered by the land 108. With an increase in jet flow through the passage 122 and a consequent increase in boat speed, the rise in pressure at the entrance to the pitot tube 104 deflects the diaphragm 105 to the right and hence in a direction reducing flow through the sump port 125. The pressure rise in the chamber 114 shifts the piston 116 to the right and thereby rocks the valve 121 counterclockwise to a position determining maximum propulsive efficiency. These valve positions will automatically vary with the boat speed and with reductions in this speed and therefore lower pressures on the pitot tube 104, the valve stem 107 is shifted to the left by a spring 126 interposed between the land 109 and the adjacent end of the casing 106, and the spring 117 effects a like movement of the piston 116 and an attendant clockwise movement of the rotary valve 121.

I claim:

1. In jet propelled, water craft having a nozzle passage and pumping means for discharging water through the passage to a rearward facing, discharge orifice as a reaction propulsive jet, control means for regulating the jet flow comprising a housing carried by the craft having spaced, vertical, side walls partly bounding the nozzle passage in their upper portions and a part cylindrical wall connecting the lower portions of the side walls, the side walls having aligned ports in their lower portions, a hollow, part cylindrical valve mounted in the lower portion of the housing and including a part cylindrical wall concentric with the housing part cylindrical wall and a substantially part diametral wall partly bounding the nozzle passage and connected at one end to one end of the valve part cylindrical wall, the opposite ends of the hollow valve being bounded by the housing side walls and the opposite end of the part diametral wall being spaced from the opposite end of the housing part cylindrical wall to provide an opening constantly connecting the nozzle passage with the interior of the hollow valve, means for rocking the hollow valve to maintain a determined relation of jet craft speed in a forward direction, a pair of spaced plate valves journaled on the housing in coaxial relation to the hollow valve and being contiguous to and masking the aligned ports, respectively, during forward movements of the craft, the plate valves including ports rotarily spaced on opposite sides of the aligned ports, respectively, and means for simultaneously rocking the plate valves independently of the hollow valve between a position registering the port of one plate valve with the adjacent port in the housing side wall and a position registering the port of the other plate valve with its adjacent port in the housing side wall, the last named positions providing propulsive jets substantially normal to the longitudinal axis of the craft for turns in opposite directions, respectively.

2. A structure as defined in claim 1 wherein the housing carries a chamber having at one end forward facing, jet propulsion orifice means and an opening masked by the part cylindrical wall of the hollow valve when in forward craft movement direction, and the hollow valve being adapted for further rocking to a position in which the last named wall unmasks the last named opening to divert a major portion of the jet flow successively through the interior of the hollow valve and chamber to the orifice means to effect reverse movement of the craft.

3. In combination with a water craft having a hull including a water intake opening, a rearward facing discharge orifice and pumping means for drawing water through the opening for discharge through a nozzle passage to the orifice as a propulsive jet for moving the craft forward, valve means adjustable to control flow through the passage to maintain a determined ratio of jet to craft speed comprising a pivoted, rotary valve having a part cylindrical shape and including a substantially radial wall forming a part of the nozzle passage, the pivot of the rotary valve being offset from the axis of the nozzle passage and the rotary valve being hollow and having its interior constantly communicating with the nozzle passage, a housing in which the rotary valve is rockable having spaced aligned ports communicating with the interior of the rotary valve, spaced plate valves coaxial with the rotary valve and contiguous to and masking the aligned ports, respectively, during forward movements of the craft, the plate valves including ports rotarily spaced on opposite sides of the aligned ports, respectively, and means for simultaneously rocking the plate valves independently of the rotary valve between a position registering the port of one plate valve with the adjacent housing port and a position registering the port of the other plate valve with its adjacent housing port, the last named positions providing propulsive jets substantially normal to the longitudinal axis of the craft for turns in opposite directions, respectively.

References Cited by the Examiner

UNITED STATES PATENTS

| 141,039 | 7/1873 | Dow | 60—35.54 |
| 1,698,822 | 1/1929 | Paxton | 60—35.6 |
| 2,024,274 | 12/1935 | Campini | 60—35.54 |
| 2,149,155 | 2/1939 | Anderson | 60—35.55 |
| 2,988,038 | 6/1961 | Tatter | 115—12 |
| 3,084,509 | 4/1963 | Parsons | 60—35.55 |
| 3,093,966 | 6/1963 | Englehart et al. | 60—35.54 |

FOREIGN PATENTS

| 567,870 | 3/1945 | Great Britain. |

MARK NEWMAN, *Primary Examiner.*

ABRAM BLUM, *Examiner.*

W. A. SCHUETZ, A. L. SMITH, *Assistant Examiners.*